United States Patent
Liu et al.

(10) Patent No.: US 11,465,124 B2
(45) Date of Patent: Oct. 11, 2022

(54) PREPARATION METHOD OF COF-5 CRYSTAL

(71) Applicant: Wuhan University of Technology, Wuhan (CN)

(72) Inventors: Yueli Liu, Wuhan (CN); Wen Chen, Wuhan (CN); Zifan Yang, Wuhan (CN); Ziwei Wang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 17 days.

(21) Appl. No.: 17/120,307

(22) Filed: Dec. 14, 2020

(65) Prior Publication Data

US 2021/0178363 A1    Jun. 17, 2021

(30) Foreign Application Priority Data

Dec. 12, 2019   (CN) .......................... 201911273052.5
Dec. 12, 2019   (CN) .......................... 201911273886.6
Dec. 12, 2019   (CN) .......................... 201911292234.7

(51) Int. Cl.
*B01J 20/22*   (2006.01)
*B01J 20/30*   (2006.01)

(52) U.S. Cl.
CPC ......... *B01J 20/226* (2013.01); *B01J 20/3071* (2013.01); *B01J 20/3078* (2013.01); *B01J 2220/4812* (2013.01)

(58) Field of Classification Search
None
See application file for complete search history.

(56) References Cited

U.S. PATENT DOCUMENTS

2014/0037944 A1*   2/2014   Dichtel .................. B01J 20/324
                                                                          428/411.1

OTHER PUBLICATIONS

Cote et al., "Porous, Crystalline, Covalent Organic Frameworks." Science, vol. 310, pp. 1166-1170 (published Nov. 18, 2005) (incl. supporting material/data pages).*

* cited by examiner

*Primary Examiner* — Daniel Berns
(74) *Attorney, Agent, or Firm* — Matthias Scholl P.C.; Matthias Scholl

(57) ABSTRACT

A preparation method for covalent organic framework 5 (COF-5) includes: adding 2,3,6,7,10,11-hexahydroxytriphenylene and 1,4-phenylenebisboronic acid to a mixed solution of 1,3,5-trimethylbenzene and 1,4-dioxane to form a mixture in the anhydrous and oxygen-free environment; and the addition ratio of 2,3,6,7,10,11-hexahydroxytriphenylene:1,4-phenylenebisboronic acid:1,3,5-trimethylbenzene:1,4-dioxane is 0.02-0.8 mmol:0.08-1.4 mmol:10-15 mL:10-15 mL; sealing the mixture in an airtight container; and obtaining a uniform dispersion solution after shaking the container for wholly mixing the components; heating the dispersion solution to a temperature ranging from 80-100° C.; reacting for a period of time ranging from 72-120 h; and obtaining a precipitate after the reaction; and washing the precipitate, drying the precipitate in vacuum, and heating the precipitate at a temperature ranging from 200-300° C. for a period of time ranging from 1-3 h with a protective atmosphere to obtain COF-5 crystal.

5 Claims, 10 Drawing Sheets

PREPARATION METHOD OF COF-5 CRYSTAL

CROSS-REFERENCE TO RELAYED APPLICATIONS

Pursuant to 35 U.S.C. § 119 and the Paris Convention Treaty, this application claims foreign priority to Chinese Patent Application No. 201911273052.5 filed on Dec. 12, 2019, and to Chinese Patent Application No. 201911273886.6 filed on Dec. 12, 2019, and to Chinese Patent Application No. 201911292234.7 filed on Dec. 12, 2019. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to the field of porous materials, and more particularly to a preparation method of COF-5 crystal.

Covalent Organic Framework (COF) crystal is a new type of organic porous polymer with periodicity and crystallinity. COF crystal has the characters of high thermal stability (to temperatures up to 500-600° C.), permanent porosity, and high surface areas (up to 1590 square meters per gram), which is formed by strong covalent bonding of light elements such as C, H, O, N, and B. Due to the strong gas adsorption capacity, COF crystals are initially used to store hydrogen, carbon dioxide, sulfur dioxide and other gases, which are widely used in fuel cells, new energy vehicles, industrial waste gas treatment and other related fields, and it is also expected to be industrialized. With the continuous research of COF crystal, it is found that COF crystal possesses great potential application in the fields of gas catalysis, energy storage, optoelectronics, and sensing, which further attracts researchers' strong interesting.

The effective synthesis of COF crystal is still a major challenge for researchers till now. Since the atoms in the COF crystal are all connected by strong covalent bonds, the formation and extension of the formed basic units require the high activation energy. In addition, for the good crystallinity of COF crystal, the reaction conditions need to be precisely controlled. In order to meet with the thermodynamic and kinetic conditions of COF crystal, the organic monomers involved in the reaction should be in a mild reaction environment with low temperature and gas pressure, and a reversible reaction for a long time at a low reaction rate is required.

The basic composition of COF crystal can be divided into two small organic molecules as connecting units and connecting monomers. These two small organic molecules condense with each other to form a network unit, and further extend to form a whole reticular crystal structure. The molecular structure of COF-5 material is relatively simple. The basic components are the connecting unit formed by 2,3,6,7,10,11-hexahydroxytriphenylene and the connecting monomer formed by 1,4-phenylenebisboronic acid, and they will form the regular hexagonal pores in the COF-5 layered molecule. The COF-5 molecular layers present an overlapping conformation, and the molecular stack makes the holes form columnar channels.

COF-5 is a typical two-dimensional borate COF crystal. The borate functional groups are evenly distributed on the COF-5 molecular layer, which may be active sites for gas chemisorption. Therefore, it has the potential application in the fields of catalysis and gas sensitivity. However, there are few works on COF-5, and the synthesis process and mechanism are still unclear. The COF-5 crystal obtained by the existing preparation method is normally large-size block, which has no regular morphology and uneven size. The crystal morphology and structure are difficult to be controlled during the preparation process. It is very difficult to prepare COF-5 crystals with regular morphology and uniform size in a large scale. If the synthesis of COF-5 crystal with good crystal growth and relatively regular morphology can be achieved, it may favor for the deep understanding of the growth process and mechanism of COF-5. The result will provide a reference for the preparation of similar COF crystal and improve the performance of COF-5 in various applications, as well as expand the application field of COF crystal.

SUMMARY

The first purpose of the disclosure is to provide a preparation method of zero-dimensional spherical COF-5 crystal. The method is a simple process that produces a crystal in spherical shape with large size, regular morphology and uniform size.

The second purpose of the disclosure is to provide a preparation method of one-dimensional rod-like COF-5 crystal. The method is a simple process that produces a crystal in rod-like shape with regular morphology and uniform size.

The third purpose of the disclosure is to provide a preparation method of two-dimensional sheet-like COF-5 crystal. The method is a simple process that produces a crystal in sheet-like shape with regular morphology and uniform size.

The disclosure provides a method for preparing zero-dimensional spherical COF-5 crystal, the method comprising:

Step A1: adding 2,3,6,7,10,11-hexahydroxytriphenylene and 1,4-phenylenebisboronic acid to a mixed solution of 1,3,5-trimethylbenzene and 1,4-dioxane to form a mixture in the anhydrous and oxygen-free environment, and the addition ratio of 2,3,6,7,10,11-hexahydroxytriphenylene: 1,4-phenylenebisboronic acid: 1,3,5-trimethylbenzene: 1,4-dioxane is 0.02-0.06 mmol: 0.08-0.15 mmol: 10-15 mL: 10-15 mL;

Step A2. sealing the mixture in an airtight container; obtaining a uniform dispersion solution after shaking the container for wholly mixing the components;

Step A3. heating the dispersion solution to a temperature; reacting for a period of time; obtaining a precipitate after the reaction; and Step A4. washing the precipitate; drying the precipitate in vacuum; heating the precipitate at a temperature for a period of time with a protective gas to obtain zero-dimensional spherical COF-5 crystal.

In a class of this embodiment, the heating temperature is in the range of 80-100° C., and the reaction time is from 72-120 h in Step A3.

In a class of this embodiment, the temperature is set in the range of 200-300° C., and the heat treatment time is from 1-3 h in Step A4.

In a class of this embodiment, the washing reagent is any one of acetone, methanol, benzene, ether, and N,N-dimethylformamide in Step A4.

In a class of this embodiment, the protective gas is any one of nitrogen, argon, and helium in Step A4.

The disclosure also provides a method for preparing one-dimensional rod-like COF-5 crystal, the method comprising:

Step B1. adding 2,3,6,7,10,11-hexahydroxytriphenylene and 1,4-phenylenebisboronic acid to a mixed solution of 1,3,5-trimethylbenzene and 1,4-dioxane to form a mixture in the anhydrous and oxygen-free environment; and the addition ratio of 2,3,6,7,10,11-hexahydroxytriphenylene: 1,4-phenylenebisboronic acid: 1,3,5-trimethylbenzene: 1,4-dioxane is 0.1-0.3 mmol: 0.1-0.5 mmol: 10-15 mL: 10-15 mL;

Step B2. sealing the mixture in an airtight container; obtaining a uniform dispersion solution after shaking the container for wholly mixing the components;

Step B3. heating the dispersion solution to a temperature; reacting for a period of time; obtaining a precipitate after the reaction; and Step B4. washing the precipitate; drying the precipitate in vacuum; heating the precipitate a temperature for a period of time with a protective gas to obtain one-dimensional rod-like COF-5 crystal.

In a class of this embodiment, the heating temperature is in the range of 80-100° C., and the reaction time is from 72-120 h in Step B3.

In a class of this embodiment, the temperature is set in the range of 200-300° C., and the heat treatment time is from 1-3 h in Step B4.

In a class of this embodiment, the washing reagent is any one of acetone, methanol, benzene, ether, and N,N-dimethylformamide in Step B4.

In a class of this embodiment, the protective gas is any one of nitrogen, argon, and helium in Step B4.

The disclosure further provides a method for preparing two-dimensional sheet-like COF-5 crystal, the method comprising:

Step C1: adding 2,3,6,7,10,11-hexahydroxytriphenylene and 1,4-phenylenebisboronic acid to a mixed solution of 1,3,5-trimethylbenzene and 1,4-dioxane to form a mixture in the anhydrous and oxygen-free environment; and the addition ratio of 2,3,6,7,10,11-hexahydroxytriphenylene: 1,4-phenylenebisboronic acid: 1,3,5-trimethylbenzene: 1,4-dioxane is 0.4-0.8 mmol: 0.6-1.4 mmol: 10-15 mL: 10-15 mL;

Step C2. sealing the mixture in an airtight container; obtaining a uniform dispersion solution after shaking the container for wholly mixing the components;

Step C3. heating the dispersion solution to a temperature; reacting for a period of time; and obtaining a precipitate after the reaction; and Step C4. washing the precipitate; drying the precipitate in vacuum; and heating the precipitate at a temperature for a period of time with a protective gas to obtain two-dimensional sheet-like COF-5 crystal.

In a class of this embodiment, the heating temperature is in the range of 80-100° C., and the reaction time is from 72-120 h in Step C3.

In a class of this embodiment, the temperature is set to the range of 200-300° C., and the heat treatment time is from 1-3 h in Step C4.

In a class of this embodiment, the washing reagent is any one of acetone, methanol, benzene, ether, and N,N-dimethylformamide in Step C4.

In a class of this embodiment, the protective gas is any one of nitrogen, argon, and helium in Step C4.

The beneficial effects of the disclosure are listed as following:

1. The disclosure adopts solvothermal synthesis to prepare a zero-dimensional spherical COF-5 crystal, the addition ratio of 2,3,6,7,10,11-hexahydroxytriphenylene, 1,4-phenylenebisboronic acid, 1,3,5-trimethylbenzene, 1,4-dioxane is controlled to be 0.02-0.06 mmol: 0.08-0.15 mmol: 10-15 mL: 10-15 mL; and the heat treatment of the product further improves the morphology and removes impurities. The present preparation method has simple process, and the zero-dimensional spherical COF-5 crystal grows well with a regular morphology and larger size. The zero-dimensional spherical COF-5 crystal has a larger packing density than other COF-5 materials, which is beneficial to the formation of a denser film to increase the carrier transmission rate, and the zero-dimensional spherical COF-5 crystal is easy to composite with other materials, such as composited with other materials on the surface of the zero-dimensional spherical COF-5 crystal to form a crystal cluster structure, or wrapped by other materials to form a core-shell structure, etc., the resulting composite material may combine the advantages of multiple materials to obtain good performance.

2. The disclosure adopts solvothermal synthesis to prepare one-dimensional rod-like COF-5 crystal by controlling the addition ratio of 2,3,6,7,10,11-hexahydroxytriphenylene, 1,4-phenylenebisboronic acid, 1,3,5-trimethylbenzene, 1,4-dioxane to be 0.1-0.3 mmol: 0.1-0.5 mmol: 10-15 mL: 10-15 mL; and the heat treatment of the product further improves the morphology and removes impurities. The present preparation method has simple process, and the one-dimensional rod-like COF-5 crystal grows well with a regular morphology. The one-dimensional rod-like COF-5 crystal has a higher specific surface area than other COF-5 materials, which can make full use of the interlayer adsorption of gas molecules or other small organic molecules. One-dimensional rod-like COF-5 crystal has a stronger adsorption capacity, which may have better performance in energy storage applications or in energy conservation and environmental protection applications, such as the storage of combustible gases or the collection and degradation of pollutants.

3. The disclosure adopts solvothermal synthesis to prepare two-dimensional sheet-like COF-5 crystal by controlling the addition ratio of 2,3,6,7,10,11-hexahydroxytriphenylene, 1,4-phenylenebisboronic acid, 1,3,5-trimethylbenzene, 1,4-dioxane to be 0.4-0.8 mmol: 0.6-1.4 mmol: 10-15 mL: 10-15 mL; and the heat treatment of the product further improves the morphology and removes impurities. The present preparation method has simple process, and the obtained two-dimensional sheet-like COF-5 crystal has a regular morphology and relatively uniform size. Compared with other COF-5 materials, the two-dimensional sheet-like COF-5 crystal has better thermal and electrical conductivity properties, and the number of active sites on the surface of the sheet-like molecules is more exposed, which is suitable as a host material and is more conducive to chemically combining with guest molecules. Two-dimensional sheet-like COF-5 crystal may have higher sensitivity and shorter response time in sensing detection and other fields.

4. When the reactant concentration is gradually lower than the above range (the addition ratio of reactants 2,3,6,7,10,11-hexahydroxytriphenylene, 1,4-phenylenebisboronic acid, 1,3,5-trimethylbenzene, 1,4-dioxane is 0.4-0.8 mmol: 0.6-1.4 mmol: 10-15 mL: 10-15 mL), the morphology of the COF-5 crystal will be one-dimensional rod-like firstly and then zero-dimensional spherical. When the reactant concentration is higher than the above range, the morphology of the COF-5 crystal is sheet-like. The higher the reactant concentration, the more difficult it is to obtain COF-5 crystals with regular morphology.

5. The reaction container selected in the disclosure is a glass bottle, which has low reaction pressure and smooth solvent convection, and is conducive to obtaining COF-5 crystal having a good appearance.

6. The disclosure provides a process of preparing COF-5 crystal under conditions of heating at 80-100° C. and reacting for 72-120 h, to make them have a more intact, ordered and regular structure. The effect is achieved due to enhancement of "self-organization" in COF-5 material during reaction. The synthesis of COF-5 crystal not only requires the reversibility of the bonding reaction between the connecting units, but also the control of the reaction rate, therefore, the connecting units can self-repair the defects generated during the reaction to form the framework structure, which is called "self-organization process".

7. In the disclosure, the COF-5 product is annealed by heating the COF-5 product to a temperature (referred to "heat treatment temperature" hereafter) ranging from 200-300° C. If the heat treatment is not performed, a small amount of 1,3,5-trimethylbenzene (one of the reaction solvents) will remain in the product, and conventional detection methods such as XRD and FT-IR are difficult to prove the presence of reactant residue. Only from the TEM image, it can be seen that there are organic residues on the edge of some COF-5 crystal. The heat treatment of the product can volatilize the 1,3,5-trimethylbenzene, which can effectively solve the problem of the residual, and improve the product purity. Therefore, the heat treatment temperature should be higher than the boiling point of 1,3,5-trimethylbenzene (164.7° C.) and lower than the lowest thermal stability temperature of COF-5 (about 300° C.).

DETAILED DESCRIPTION

Figure 1:
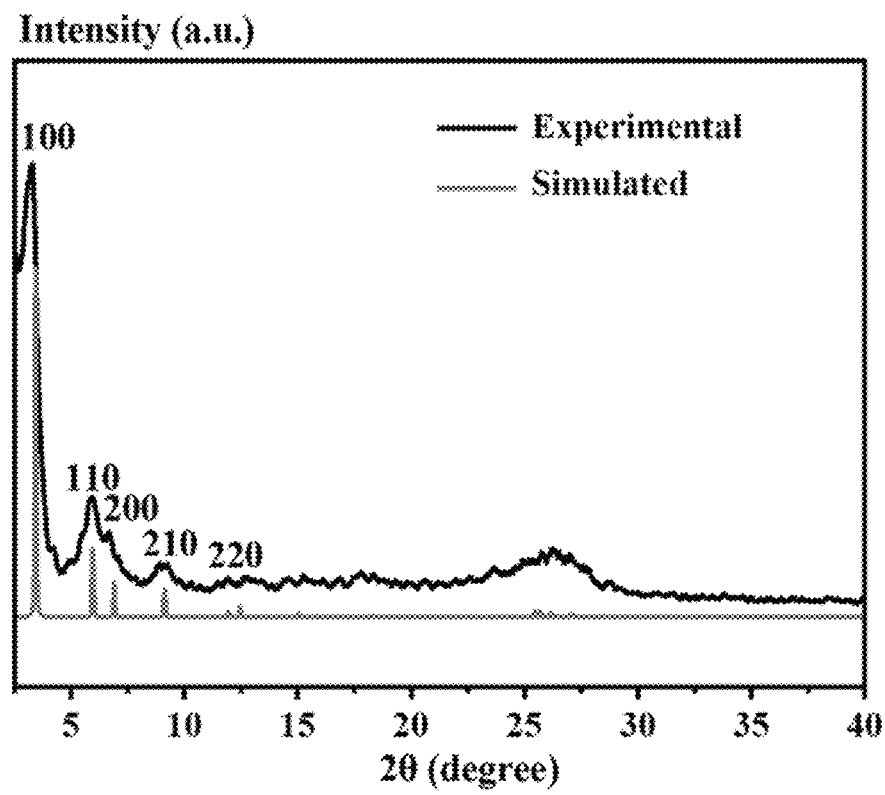
FIG. 1: XRD pattern of zero-dimensional spherical COF-5 crystal prepared in Example 1.

The following Examples 1-4 will in detail describe the specific implementation of zero-dimensional spherical COF-5 crystal involved in the disclosure with reference and FIGS. 1-4.

Example 1

A preparation method of a zero-dimensional spherical COF-5 crystal provided in Example 1 comprises the following steps:

(A1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.02 mmol: 0.08 mmol: 12.5 mL: 12.5 mL;

(A2) the mixture was sealed in an airtight container and then a uniform dispersion solution was obtained after shaking the container for wholly mixing the components;

(A3) the dispersion solution was heated to 100° C., and then reacted for 72 h; a precipitate was obtained after the reaction; and (A4) the precipitate was washed with acetone and then dried in vacuum, and finally the precipitate was heated at 200° C. for 3 h with an argon protective gas to obtain a zero-dimensional spherical COF-5 crystal.

Example 2

A preparation method of a zero-dimensional spherical COF-5 crystal provided in Example 2 comprises the following steps:

(A1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.04 mmol: 0.12 mmol: 13 mL: 12 mL;

(A2) the mixture was sealed in an airtight container and then a uniform dispersion solution was obtained after shaking the container for wholly mixing the components;

(A3) the dispersion solution was heated to 85° C., and then reacted for 84 h; a precipitate was obtained after the reaction; and (A4) the precipitate was washed with acetone and then dried in vacuum, and finally the precipitate was heated at 220° C. for 1 h with an argon protective gas to obtain a zero-dimensional spherical COF-5 crystal.

Example 3

A preparation method of a zero-dimensional spherical COF-5 crystal provided in Example 3 comprises the following steps:

(A1) In the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.05 mmol: 0.1 mmol: 10 mL: 15 mL;

(A2) The mixture was sealed in an airtight container and then a uniform dispersion solution was obtained after shaking the container for wholly mixing the components;

(A3) The dispersion solution was heated to 80° C., and then reacted for 72 h; a precipitate was obtained after the reaction; and (A4) the precipitate was washed with acetone and then dried in vacuum, and finally the precipitate was heated at 250° C. for 2 h with an argon protective gas to obtain a zero-dimensional spherical COF-5 crystal.

Example 4

A preparation method of a zero-dimensional spherical COF-5 crystal provided in Example 4 includes the following steps:

(A1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.06 mmol: 0.15 mmol: 15 mL: 10 mL;

(A2) the mixture was sealed in an airtight container and then a uniform dispersion solution was obtained after shaking the container for wholly mixing the components;

(A3) the dispersion solution was heated to 95° C., and then reacted for 120 h; and a precipitate was obtained after the reaction;

(A4) the precipitate was washed with acetone and then dried in vacuum; and the precipitate was heated at 300° C. for 2 h with an argon protective gas to obtain a zero-dimensional spherical COF-5 crystal.

Further, zero-dimensional spherical COF-5 crystals prepared in the above examples were characterized and tested:

As shown in FIG. 1, the positions and relative intensities of the diffraction peaks obtained from actual tests (experimental values) in the XRD pattern are highly matched with those of the theoretical calculations (simulation values). Therefore, the synthesized product of the disclosure is COF-5 crystal.

Figure 2:
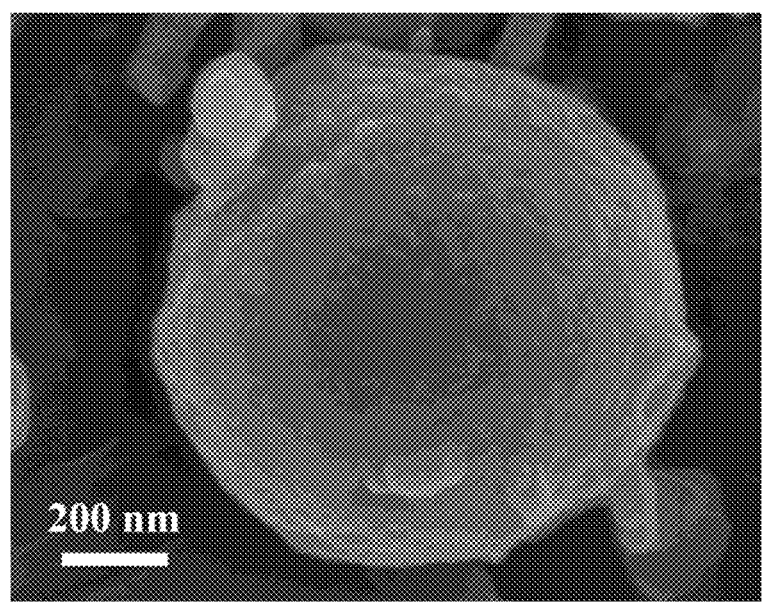
FIG. 2: FT-IR diagram of zero-dimensional spherical COF-5 crystal prepared in Example 2.
Figure 3:
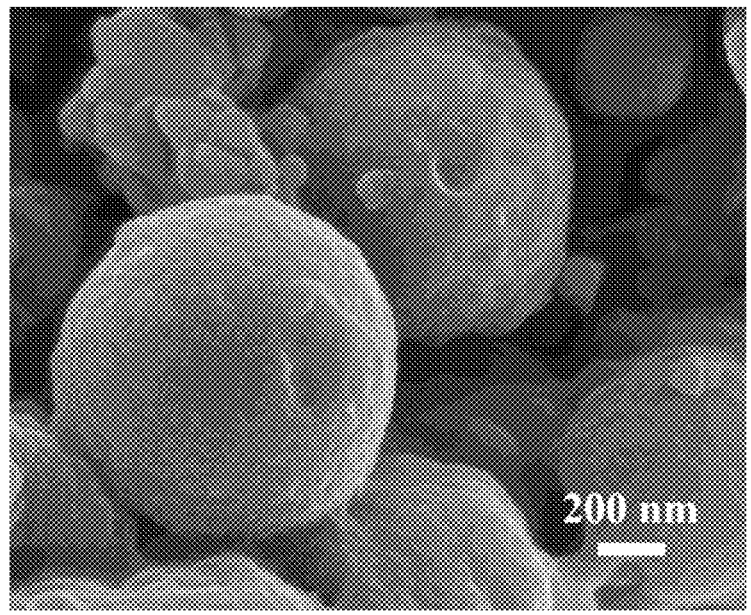
FIG. 3: SEM image of zero-dimensional spherical COF-5 crystal prepared in Example 3.
Figure 4:
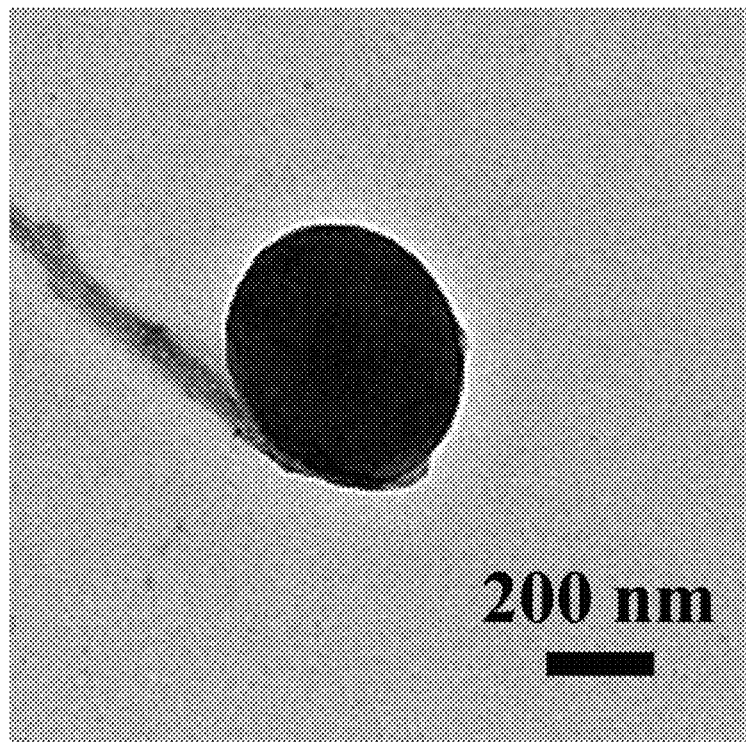
FIG. 4: TEM image of zero-dimensional spherical COF-5 crystal prepared in Example 4.

As shown in FIGS. 2-4, the COF-5 crystals obtained in different examples of the disclosure have the zero-dimensional spherical morphology with large dimensions of predominantly 1 μm.

In addition, in Step 2 a vortex mixer was used for the shaking treatment for all of the above examples, and the shaking time was about 1 min; the temperature of the vacuum drying treatment in Step 4 was in the range of 60-90° C., and the drying time was from 24-36 h; Step 2 and Step 3 were carried out under the sealed conditions.

The following Examples 5 to 8 will describe in detail the specific implementation of one-dimensional rod-like COF-5 crystal involved in the disclosure with reference and FIGS. 5-8.

Example 5

A preparation method of a one-dimensional rod-like COF-5 crystal provided in Example 5 comprises the following steps:

(B1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.1 mmol: 0.1 mmol: 12.5 mL: 12.5 mL;

(B2) the mixture was sealed in an airtight container; then the container was put into an ultrasonic cleaner for processing, and was shaken after ultrasonication; a uniform dispersion solution was obtained after shaking the container for wholly mixing the components;

(B3) the dispersion solution was heated to 85° C., and then reacted for 72 h. A precipitate was obtained after the reaction; and (B4) the precipitate was washed with acetone and then dried in vacuum, and finally the precipitate was heated at 200° C. for 1 h with an argon protective gas to obtain a one-dimensional rod-like COF-5 crystal.

Example 6

A preparation method of a one-dimensional rod-like COF-5 crystal provided in Example 6 comprises the following steps:

(B1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.2 mmol: 0.3 mmol: 12 mL: 13 mL;

(B2) the mixture was sealed in an airtight container; then the container was put into an ultrasonic cleaner for processing, and was shaken after ultrasonication; a uniform dispersion solution was obtained after shaking the container for wholly mixing the components;

(B3) the dispersion solution was heated to 100° C., and then reacted for 84 h; and a precipitate was obtained after the reaction; and (B4) the precipitate was washed with acetone and then dried in vacuum, and finally the precipitate was heated at 220° C. for 1 h with an argon protective gas to obtain a one-dimensional rod-like COF-5 crystal.

Example 7

A preparation method of a one-dimensional rod-like COF-5 crystal provided in Example 7 comprises the following steps:

(B1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.3 mmol: 0.5 mmol: 10 mL: 15 mL;

(B2) the mixture was sealed in an airtight container; then the container was put into an ultrasonic cleaner for processing, and was shaken after ultrasonication; a uniform dispersion solution was obtained after shaking the container for wholly mixing the components;

(B3) the dispersion solution was heated to 80° C., and then reacted for 96 h; a precipitate was obtained after the reaction; and (B4) the precipitate was washed with acetone and then dried in vacuum, and finally the precipitate was heated at 250° C. for 2 h with an argon protective gas to obtain a one-dimensional rod-like COF-5 crystal.

Example 8

A preparation method of one-dimensional rod-like COF-5 crystal provided in Example 8 comprises the following steps:

(B1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.3 mmol: 0.3 mmol: 15 mL: 10 mL;

(B2) the mixture was sealed in an airtight container; then the container was put into an ultrasonic cleaner for processing, and was shaken after ultrasonication; a uniform dispersion solution was obtained after shaking the container for wholly mixing the components;

(B3) the dispersion solution was heated to 95° C., and then reacted for 120 h; a precipitate was obtained after the reaction; and (B4) the precipitate was washed with acetone and then dried in vacuum, and finally the precipitate was heated at 300° C. for 2 h with an argon protective gas to obtain one-dimensional rod-like COF-5 crystal.

Figure 5:
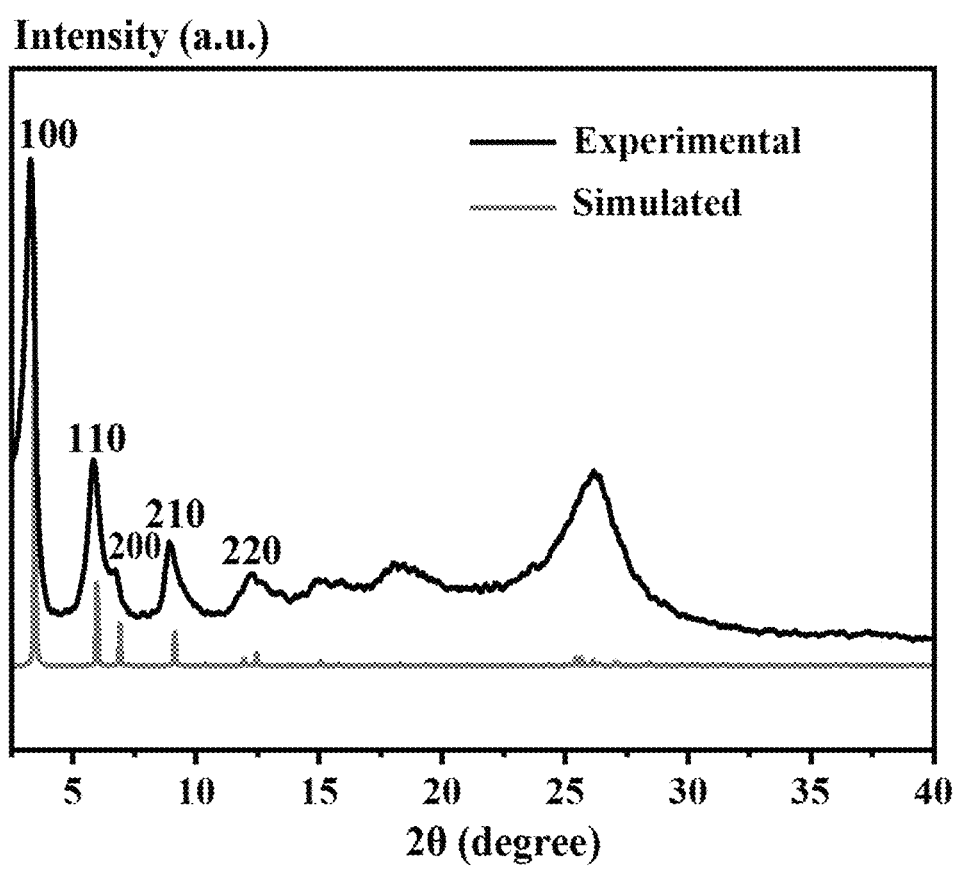
FIG. 5: XRD pattern of one-dimensional rod-like COF-5 crystal prepared in Example 5.
Figure 6:
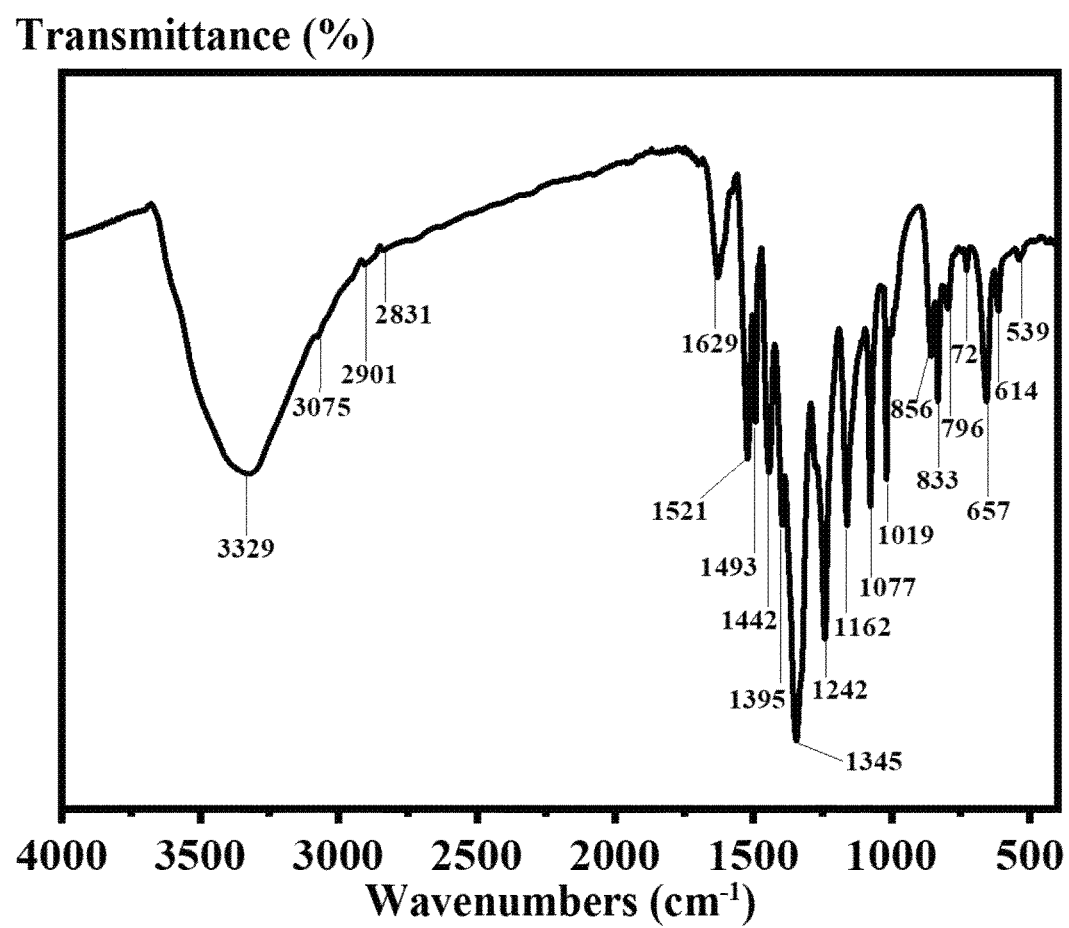
FIG. 6: FT-IR diagram of one-dimensional rod-like COF-5 crystal prepared in Example 6.

Furthermore, one-dimensional rod-like COF-5 crystals prepared in the above Examples 5-8 were characterized and tested:

As shown in FIG. 5, the positions and relative intensities of the diffraction peaks obtained from actual tests (experimental values) are highly matched with those of the theoretical calculations (simulation values) in the XRD pattern. As shown in FIG. 6, each infrared absorption peak in the FT-IR spectrum corresponds to the characteristic absorption peak of the functional group contained in the COF-5 crystal. These data all indicate that the synthesized product of the disclosure is COF-5 crystal.

Figure 7:
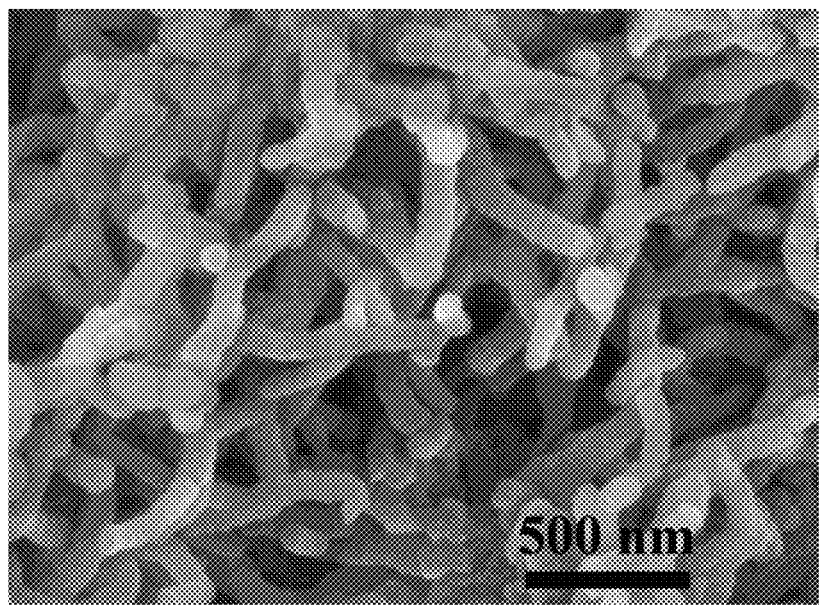
FIG. 7: SEM image of one-dimensional rod-like COF-5 crystal prepared in Example 7.
Figure 8:
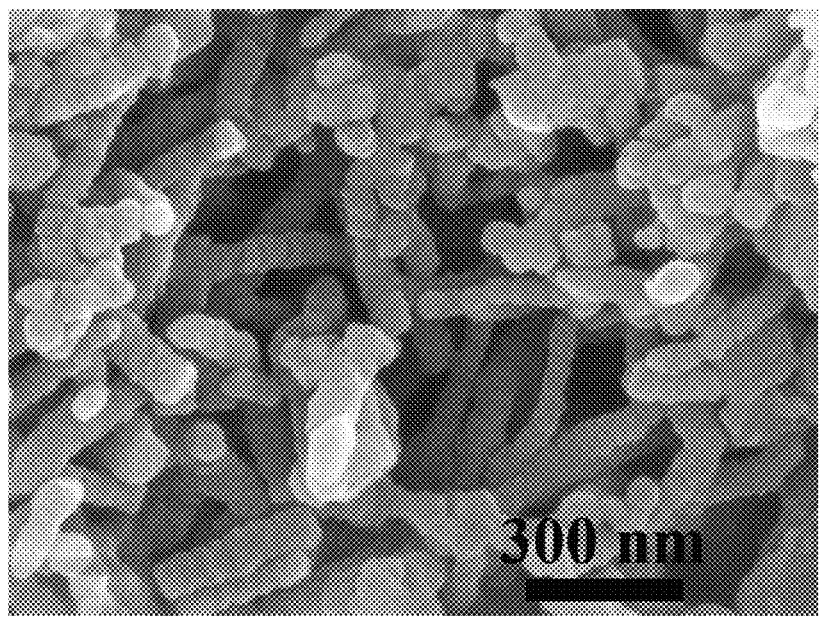
FIG. 8: SEM image of one-dimensional rod-like COF-5 crystal prepared in Example 8.

As shown in FIGS. 7 and 8, the COF-5 crystals obtained in different examples of the disclosure have the one-dimensional rod-like morphology, the crystal size is relatively large, and one-dimensional rod-like COF-5 crystal obtained at the reaction temperature of 80° C. has a larger and more uniform crystal size compared with that synthesized at the reaction temperature of 95° C. Therefore, the size of the synthesized one-dimensional rod-like COF-5 crystals can be controlled by regulating the reaction temperature.

In addition, the frequency of the ultrasonic treatment in step 2 was 70 Hz in the above Examples 5-8, and the ultrasonic time was from 5-10 min; t a vortex mixer was used for the shaking treatment, and the shaking time was about 1 min; the temperature of the vacuum drying treatment in Step 4 was in the range of 60-90° C., and the drying time was from 24-36 h; Step 2 and Step 3 were carried out under sealed conditions.

The following Examples 9-13 will describe in detail the specific implementation of two-dimensional sheet-like COF-5 crystal involved in the disclosure with reference to FIGS. 9-15.

Example 9

A preparation method of a two-dimensional sheet-like COF-5 crystal provided in Example 9 comprises the following steps:

(C1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.4 mmol: 0.6 mmol: 12.5 mL: 12.5 mL;

(C2) the mixture was sealed in an airtight container; then the container was put into an ultrasonic cleaner for processing, and was shaken after ultrasonication; a uniform dispersion solution was obtained after shaking the container for wholly mixing the components;

(C3) the dispersion solution was heated to 95° C.; and then reacted for 72 h; a precipitate was obtained after the reaction; and (C4) the precipitate was washed with acetone and then dried in vacuum, and finally the precipitate was heated at 200° C. for 3 h with an argon protective gas to obtain a two-dimensional sheet-like COF-5 crystal.

Example 10

A preparation method of a two-dimensional sheet-like COF-5 crystal provided in Example 10 comprises the following steps:

(C1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.5 mmol: 0.9 mmol: 12 mL: 13 mL;

(C2) the mixture was sealed in an airtight container; then the container was put into an ultrasonic cleaner for processing, and was shaken after ultrasonication; a uniform dispersion solution was obtained after shaking the container for wholly mixing the components;

(C3) the dispersion solution was heated to 85° C., and then reacted for 84 h, and then reacted for 84 h; and a precipitate was obtained after the reaction; and (C4) the precipitate was washed with acetone and then dried in vacuum, and finally the precipitate was heated at 220° C. for 1 h with an argon protective gas to obtain a two-dimensional sheet-like COF-5 crystal.

Example 11

A preparation method of a two-dimensional sheet-like COF-5 crystal provided in Example 11 comprises the following steps:

(C1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.6 mmol: 1.0 mmol: 10 mL: 15 mL;

(C2) The mixture was sealed in an airtight container. Then the container was put into an ultrasonic cleaner for processing, and was shaken after ultrasonication. A uniform dispersion solution was obtained after shaking the container for wholly mixing the components;

(C3) The dispersion solution was heated to 100° C., and then reacted for 72 h. A precipitate was obtained after the reaction;

(C4) The precipitate was washed with acetone and then dried in vacuum, and finally the precipitate was heated at 250° C. for 2 h with an argon protective gas to obtain a two-dimensional sheet-like COF-5 crystal.

Example 12

The preparation method of a two-dimensional sheet-like COF-5 crystal provided in Example 12 comprises the following steps:

(C1) in the anhydrous and oxygen-free environment, the 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.7 mmol: 1.3 mmol: 15 mL: 10 mL;

(C2) the mixture was sealed in an airtight container; then the container was put into an ultrasonic cleaner for processing, and was shaken after ultrasonication. A uniform dispersion solution was obtained after shaking the container for wholly mixing the components;

(C3) the dispersion solution was heated to 80° C., and then reacted for 120 h; a precipitate was obtained after the reaction; and (C4) the precipitate was washed with acetone and then dried in vacuum, and finally the precipitate was heated at 300° C. for 2 h with the argon protective gas to obtain a two-dimensional sheet-like COF-5 crystal.

Example 13

A preparation method of a two-dimensional sheet-like COF-5 crystal provided in Example 13 comprises the following steps:

(C1) in the anhydrous and oxygen-free environment, 2,3,6,7,10,11-hexahydroxytriphenylene and 1,4-phenylenebisboronic acid were added to 1,3,5-trimethylbenzene and 1,4-dioxane to form a mixture, and the addition ratio of 2,3,6,7,10,11-hexahydroxytriphenylene: 1,4-phenylenebisboronic acid: 1,3,5-trimethylbenzene: 1,4-dioxane was 0.8 mmol: 1.4 mmol: 13 mL: 12 mL;

(C2) the mixture was sealed in an airtight container; then the container was put into an ultrasonic cleaner for processing, and was shaken after ultrasonication; and a uniform dispersion solution was obtained after shaking the container for wholly mixing the components;

(C3) the dispersion solution was heated to 85° C., and then reacted for 120 h; and a precipitate was obtained after the reaction; and (C4) the precipitate was washed with acetone and then dried in vacuum, and finally the precipitate was heated at 250° C. for 1 h with the argon protective gas to obtain a two-dimensional sheet-like COF-5 crystal.

Figure 9:
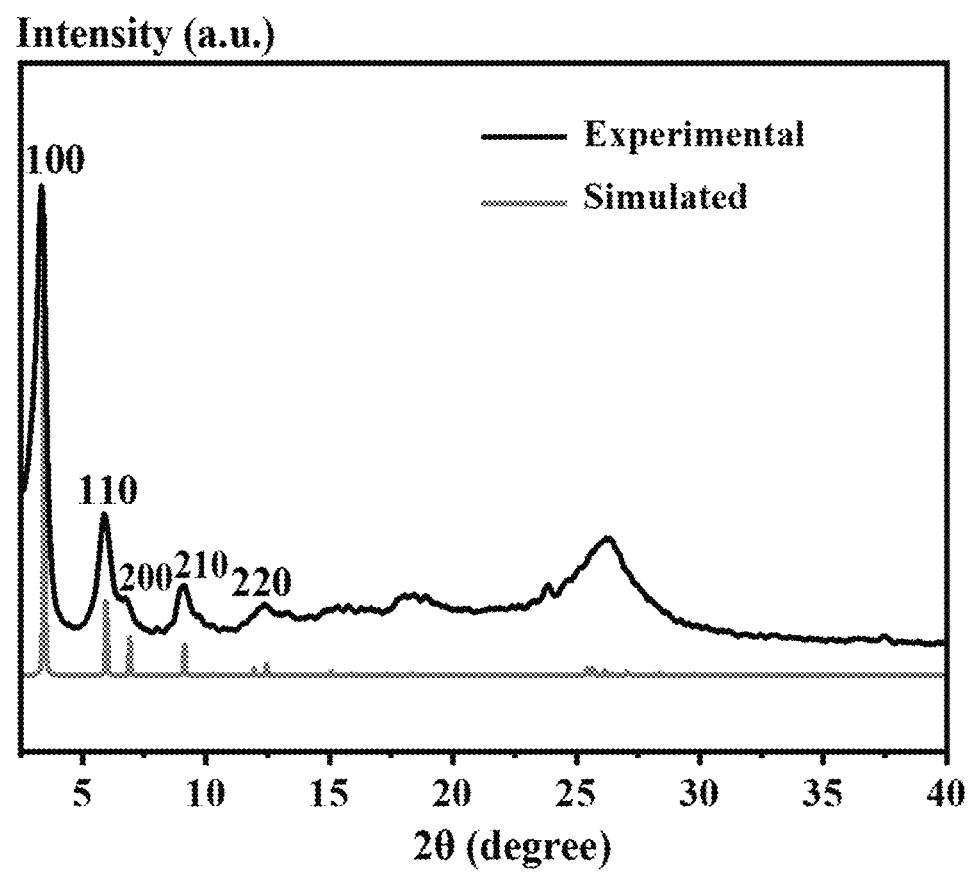
FIG. 9: XRD pattern of two-dimensional sheet-like COF-5 crystal prepared in Example 9.
Figure 10:
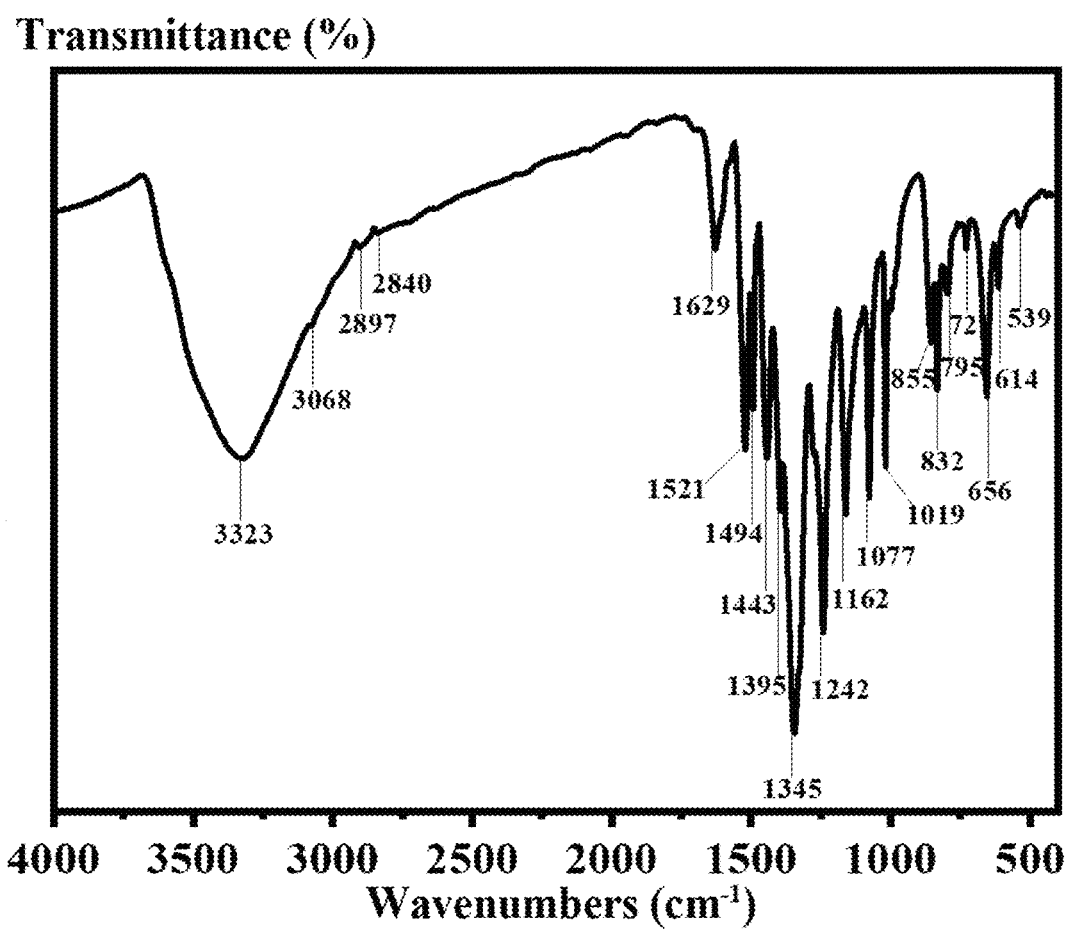
FIG. 10: FT-IR diagram of two-dimensional sheet-like COF-5 crystal prepared in Example 10.

Further, two-dimensional sheet-like COF-5 crystals prepared in the above Examples 9 to 13 were characterized and tested:

As shown in FIG. 9, the positions and relative intensities of the diffraction peaks obtained from actual tests (experimental values) in the XRD pattern are highly matched with those of the theoretical calculations (simulation values). As shown in FIG. 10, each infrared absorption peak in the FT-IR spectrum corresponds to the characteristic absorption peak of the functional group contained in the COF-5 crystal. These data all indicate that the synthesized product of the disclosure is COF-5 crystal.

Figure 11:
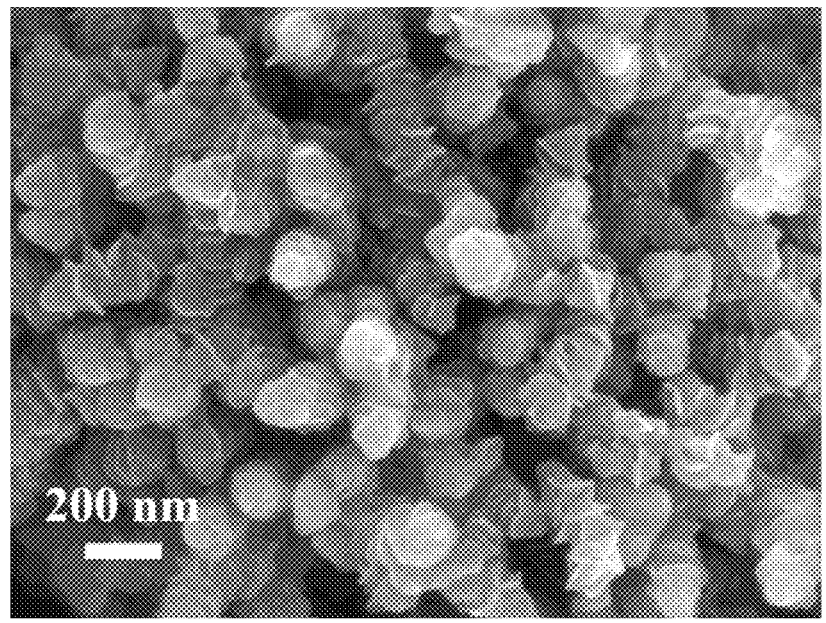
FIG. 11: SEM image of two-dimensional sheet-like COF-5 crystal prepared in Example 11.
Figure 12:
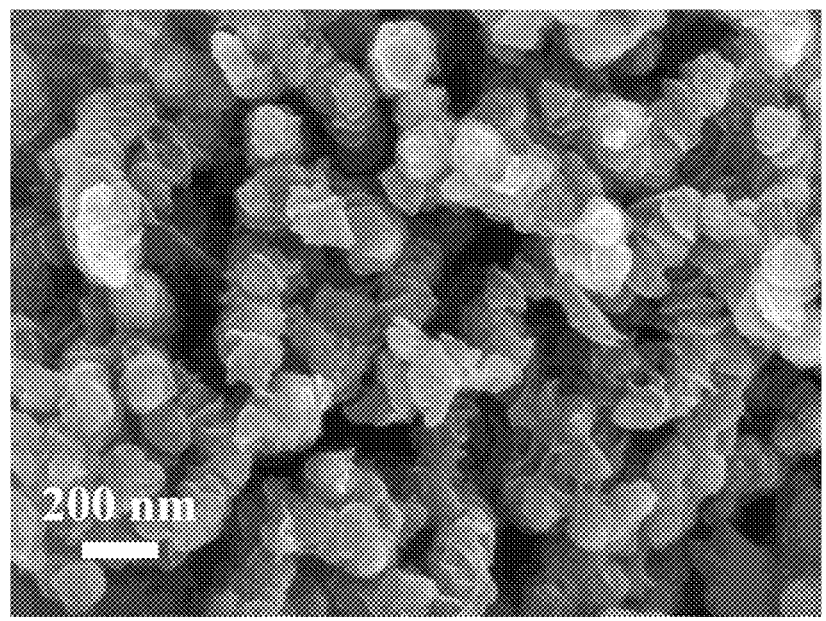
FIG. 12: SEM image of two-dimensional sheet-like COF-5 crystal prepared in Example 12.
Figure 13:
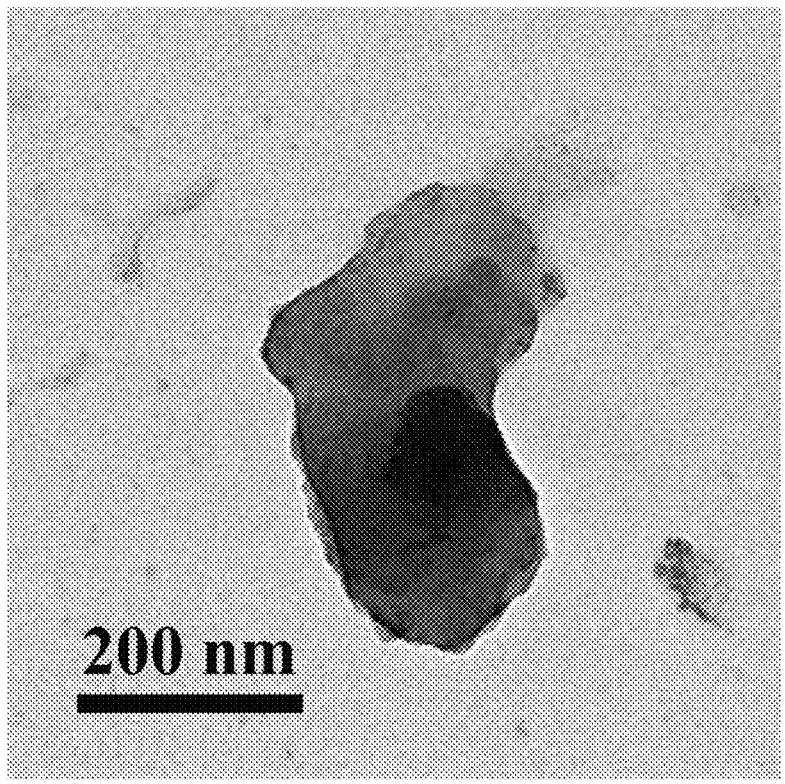
FIG. 13: TEM image of two-dimensional sheet-like COF-5 crystal prepared in Example 13.

As shown in FIGS. 11 and 12, COF-5 crystals obtained in different examples of the disclosure have the sheet-like morphology with slightly wrinkle. The sheets with relatively uniform size are stacked on each other. Two-dimensional sheet-like COF-5 crystals obtained under different experimental conditions have no obvious difference in the morphology and size. In order to observe the morphology of two-dimensional sheet-like COF-5 crystals more clearly, two-dimensional sheet-like COF-5 crystals were fully dispersed by ultrasonication and were diluted with acetone for TEM test. As shown in FIG. 13, a small amount of thin two-dimensional sheet-like crystal structure with stacking relationship between the flakes can be seen, indicating that the material is formed by stacking many sheet-like crystals. It is difficult to obtain a single-layer sheet-like crystal due to the certain interaction force between the sheets.

Figure 14:
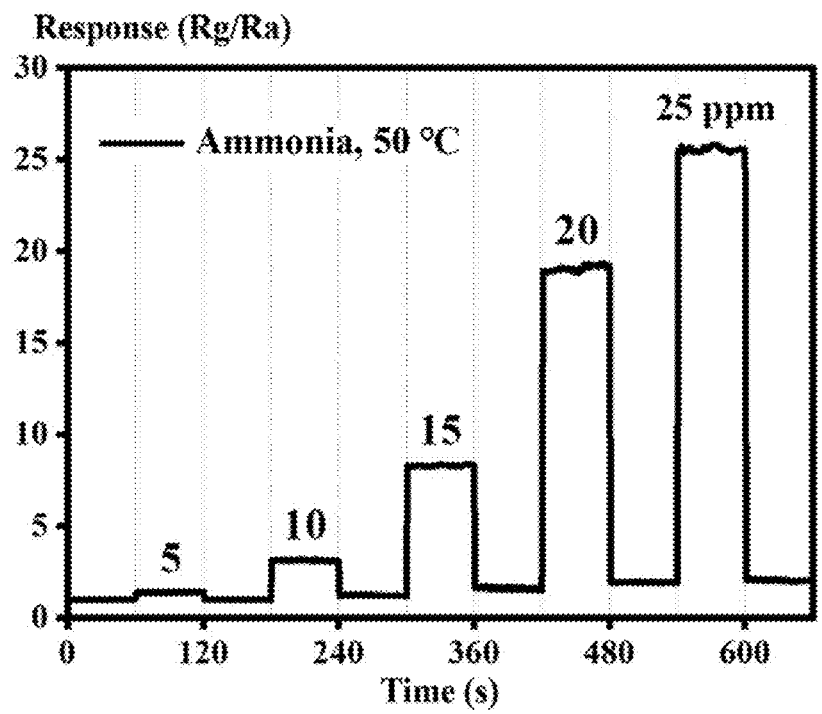
FIG. 14: Gas sensitivity of two-dimensional sheet-like COF-5 crystal of Example 9 to high concentration of ammonia.
Figure 15:
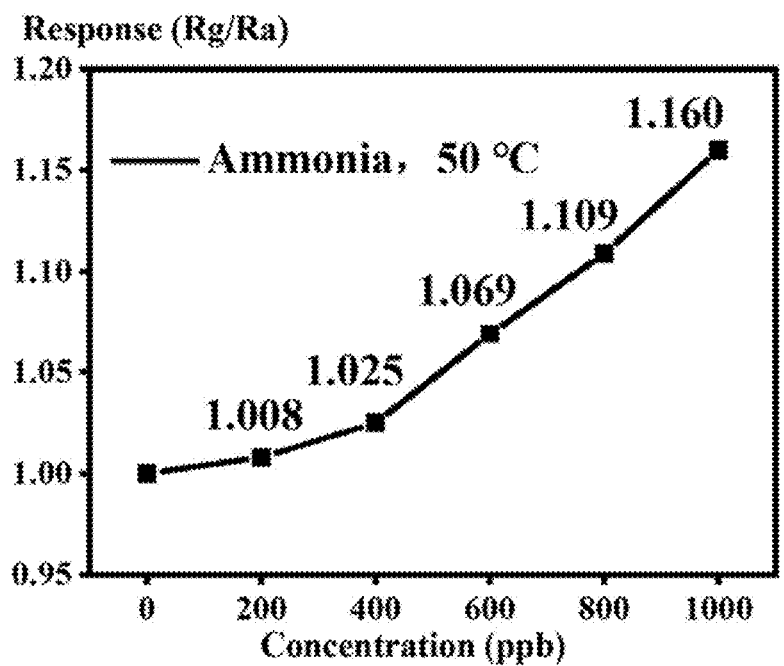
FIG. 15: Gas sensitivity of two-dimensional sheet-like COF-5 crystal of Example 9 to low concentration of ammonia.

As shown in FIGS. 14 and 15, the gas sensitivity test of two-dimensional sheet-like COF-5 crystal shows a good gas sensitivity response to ammonia at a high concentration range of 5-25 ppm and a low concentration range of 100-1000 ppb at 50° C.

In addition, the frequency of the ultrasonic treatment in step 2 was 70 Hz in the above Examples 9-13, and the ultrasonic time was from 5-10 min; a vortex mixer was used for the shaking treatment, and the shaking time was about 1 min; the temperature of the vacuum drying treatment in Step 4 was in the range of 60-90° C., and the drying time was from 24-36 h; Step 2 and Step 3 were carried out under sealed conditions.

It will be obvious to those skilled in the art that changes and modifications may be made, and therefore, the aim in the appended claims is to cover all such changes and modifications.

What is claimed is:

1. A method for preparing one-dimensional rod-shaped covalent organic framework 5 (COF-5) crystals, the method comprising:
   2.1) adding 2,3,6,7,10,11-hexahydroxytriphenylene and 1,4-phenylenebisboronic acid to a mixed solution of 1,3,5-trimethylbenzene and 1,4-dioxane to form a mixture in the anhydrous and oxygen-free environment; and a ratio of 2,3,6,7,10,11-hexahydroxytriphenylene: 1,4-phenylenebisboronic acid: 1,3,5-trimethylbenzene: 1,4-dioxane is 0.1-0.3 mmol: 0.1-0.5 mmol: 10-15 mL: 10-15 mL;
   2.2) sealing the mixture in an airtight container; obtaining a uniform dispersion solution after shaking the container for wholly mixing the components;
   2.3) heating the dispersion solution to a temperature; reacting for a period of time; obtaining a precipitate after the reaction; and
   2.4) washing the precipitate by using a washing reagent; drying the precipitate in vacuum; heating the precipitate at a temperature for a period of time in the presence of a protective gas to obtain the one-dimensional rod-shaped COF-5 crystals.

2. The method of claim 1, wherein in 2.3), a heating temperature is in the range of 80-100° C., and a reaction time is from 72 to 120 h.

3. The method of claim 1, wherein in 2.4), a heating temperature is in the range of 200-300° C., and a reaction time is from 1 to 3 h.

4. The method of claim 1, wherein in 2.4), the washing reagent is any one of acetone, methanol, benzene, ether, and N,N-Dimethylformamide.

5. The method of claim 1, wherein in 2.4), the protective gas is any one of nitrogen, argon, and helium.

* * * * *